United States Patent [19]

Satake et al.

[11] 4,103,278
[45] Jul. 25, 1978

[54] OBSTACLE DETECTING APPARATUS USING ULTRASONIC WAVES

[76] Inventors: Kanje Satake, No. 1075-9, Amanuma, Chigasaki-shi, Kanagawa-ken; Yasuo Shimazu, No. 1748-1, Kagawa, Chigasaki-shi, Kanagawa-ken; Masaru Kasahara, 2-4-2-206, Suwa, Tama-shi, Tokyo; Seya Adachi, 3-14-20, Higashiterao, Tsurumi-ku, Kawasaki-shi, Kanagawa-ken, all of Japan

[21] Appl. No.: 747,539

[22] Filed: Dec. 6, 1976

[51] Int. Cl.² .................... G01S 9/68; G01S 7/54; G01S 7/56
[52] U.S. Cl. .................... 340/1 R; 340/3 C
[58] Field of Search .................... 340/1 R, 3 C

[56] References Cited

U.S. PATENT DOCUMENTS

| 3,234,502 | 2/1966 | Sicuranza | 340/1 R |
| 3,380,028 | 4/1968 | Gustafson et al. | 340/3 C |

Primary Examiner—Richard A. Farley
Attorney, Agent, or Firm—Michael J. Striker

[57] ABSTRACT

The present invention relates to an obstacle detecting apparatus using ultrasonic waves, wherein an ultrasonic transmitter-receiver and an ultrasonic receiver are provided at a desired interval, and thereby the distance and the direction to the obstacle are obtained by the intersecting point between the circular locus of the first reflected wave returning after reflection at the obstacle, and the elliptical locus of the second reflected wave to the ultrasonic receiver. Under this structure, when any person or any obstacle like a building exists within the dead angle of a motor vehicle in case a driver is going to back it, the driver is informed of the distance and the direction to the obstacle by means of the obstacle detecting apparatus using ultrasonic waves.

4 Claims, 12 Drawing Figures

OBSTACLE DETECTING APPARATUS USING ULTRASONIC WAVES

BACKGROUND OF THE INVENTION

When a driver backs a motor vehicle, he or she must see an obstacle or the like accurately by his or her own eyes or a back mirror. But in view of the structure of the body of the motor vehicle, it is extremely difficult to see an obstacle which exists within the dead angle. Therefore, there is installed a mirror of a specific structure or an obstacle detecting device using a high frequency wave or an infrared rays. The disadvantage of the mirror of a specific structure is that it is often not available for installation in view of the structure of the motor vehicle body, and that it is difficult to catch an obstacle at the night time or at a dark place or at the time of snowing or raining. On the other hand, the obstacle detecting device made of a transmitter-receiver which aims at confirming existence of an obstacle by detecting the reflection time from the obstacle has such a disadvantage that it is difficult to detect a direction of the obstacle, while it is possible to detect a distance between the obstacle and the motor vehicle. Further, even if the transmitter-receiver adopts a sweeping system for a certain speed rotation, more than twice measurings are required, and it is very important to eliminate false signals. Still further, since it is required to actuate the transmitter-receiver mechanically, a complicated mechanism must be arranged.

For the sake of eliminating the above disadvantages of the conventional art, the present invention has been achieved.

BRIEF SUMMARY OF THE INVENTION

Accordingly, it is the primary object of this invention to provide an obstacle detecting apparatus using ultrasonic waves, wherein an ultrasonic transmitter-receiver and an ultrasonic receiver are provided at a desired interval, and thereby the distance and direction to the obstacle are obtained by the intersecting point between the circular locus of the first reflected wave returning after reflection at the obstacle and the elliptical locus of the second reflected wave to the ultrasonic receiver. Under this structure, when any person or any obstacle like a building exists within the dead angle of a motor vehicle in case a driver is going to back it, the driver is informed of the distance and the direction to the obstacle by means of the obstacle detecting apparatus using ultrasonic waves.

It is another object of this invention to provide an obstacle detecting apparatus using ultrasonic waves, wherein one time measuring enables to detect accurately the position of the obstacle so that ultrasonic waves are not transmitted and received mechanically.

It is another object of this invention to provide an obstacle detecting apparatus using ultrasonic waves, wherein the position of the obstacle can be indicated accurately by a preferred polar coordinate display unit.

It is another object of this invention to provide a polar coordinate type display unit, wherein out of a plurality of input signals a part of them is indicated by a deflection angle indicator, while the other part of them by a radius vector indicator, and a plurality of signals are indicated in relation with the quantity of signals so as to be indicated simultaneously and by the form of polar coordinate.

It is still another object of this invention to provide a polar coordinate type display unit, wherein a plurality of input signal quantity can be indicated on the same indicator in relation with each other, thereby the condition of input signals being visible at a glance.

Other and further objects, features and advantages of this invention will be apparent from the following description taken in connection with the accompanying drawings.

DETAILED DESCRIPTION OF THE INVENTION

Figure 1:
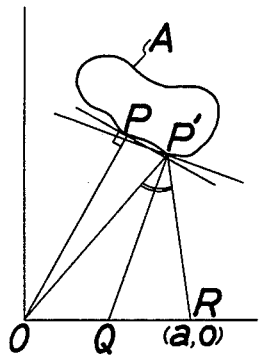
FIG. 1 is a detail view for obtaining the direction to and the distance to an object by an intersecting point between a circular locus and an elliptical locus.

Hereinafter a description will be given on an exemplary embodiment of the present invention. Prior to that, the principle of measuring a distance and a direction by the use of reflected ultrasonic waves will be explained in detail with reference to FIG. 1.

Supposing now that an object A exists within a range of $x \geq 0$, an ultrasonic transmitting source is installed at a point O (origin of coordinates) and a receiver R is disposed at a fixed point $(a, O)$ on the x-axis. The ultrasonic transmitting source installed at the point O is transmitter-receiver which functions as a receiver after transmission of ultrasonic waves for a predetermined time. The wave front of the ultrasonic signal transmitted from the point source is propagated in the form of spherical wave, and arrives at a point P which is in the minimum distance between the point O and the surface of object A, and then is reflected to the point O again. In the meanwhile, out of all the reflected ultrasonic waves arriving at the receiver R located at the point $(a, O)$, consideration is now given merely to those passing through the minimum-distance path from the transmission point O via the surface of object A to the receiver R. If the wave reflected at a point P' is received first at the receiver R, then the locus of point P', of which segment OP' + P'R is fixed, draws an ellipse. That is, the point where this ellipse is in contact with the surface of object A is P'.

Referring next to the ellipse and the tangent line, there exists a relation <OP'Q = <RP'Q, in which Q is a point where the segment perpendicular to the tangent line intersects the x-axis. Therefore, the path OP'R is minimum from the property of reflection of ultrasonic waves.

Time periods $t_o$ and $t_1$ required respectively until reception at the point O and the receiver R are given by $$t_o = 2 \times OP/C \tag{1}$$

$$t_f = OP' + P'R/C \tag{2}$$

in which C (m/sec) denotes sonic velocity.
Now, if $$OP = r \tag{3}$$

$$OP' + P'R = l \tag{4}$$

then, the locus of point P becomes a circle, which is expressed as $$x^2 + y^2 = r^2 \tag{5}$$

Also, the locus of point P' becomes an ellipse. Since $$\sqrt{x^2 + y^2} + \sqrt{(a-x)^2 + y^2} = l$$

the ellipse is expressed as $$\frac{\left(x - \frac{a}{2}\right)^2}{\left(\frac{l}{2}\right)^2} + \frac{y^2}{\left(\frac{\sqrt{l^2 - a^2}}{2}\right)^2} = 1 \tag{6}$$

Therefore, from Equations (5) and (6), the coordinates of the intersection points S are $$\frac{-l^2 - a^2 + 2alr}{2a}, \frac{\sqrt{(l^2 - a^2)(-l^2 + a^2 + 4lr - 4r^2)}}{2a};$$

Accordingly, from this intersecting point S, a proximation of the minimum distance Lmin between the object A and the x-axis is found as follows.

$$Lmin \doteq \frac{\sqrt{(l^2 - a^2)(-l^2 + a^2 + 4lr - 4r^2)}}{2a} \tag{7}$$

as for the direction, it is expressed as $$\theta = \tan^{-1} \frac{\sqrt{(l^2 - a^2)(-l^2 + a^2 + 4lr - 4r^2)}}{-l^2 - a^2 + 2alr} \tag{8}$$

Substituting Equation (1) with $OP = r = C_{t_o}/2 = N_o$ and also substituting Equation (2) with $OP' + P'R = l = C_{t_1} = N_1$ (in which $N_O$ and $N_1$ denote the number of counted pulses each representing a unit length), then Equations (7) and (8) are written as $$Lmin \doteq \frac{\sqrt{(N_1^2 - a^2)(-N_1^2 + a^2 + 4N_1N_0 - 4N_0^2)}}{2a} \tag{9}$$

$$\theta = \tan^{-1} \frac{\sqrt{(N_1^2 - a^2)(-N_1^2 + a^2 + 4N_1N_0 - 4N_0^2)}}{-N_1^2 - a^2 + 2aN_0N_1} \tag{10}$$

And thus, the minimum distance and the direction from the x-axis to the object A are obtained.

The above-mentioned is an instance where the object is within a range of $x \geq 0$. In the case of $x \leq O$ as well, it is also possible to find approximately the minimum distance and the direction from the x-axis to the object by locating a receiver R at a point $(-a, O)$, then measuring the minimum distance and the direction in the second quadrant, and comparing them with the values in the first quadrant. Since the distance and direction thus obtained are approximate solutions, it is of cource necessary to correct the error for improving the measurement accuracy. As this method is effected merely by zero adjustment of an indicator without any calculation, it is more convenient.

Here we touch upon the number and locations of transmitters and receivers. For measuring both a distance and a direction, as described already, it is necessary to receive a transmitted signal at two or more different positions. As in the case of using one transmitter and two receivers, the same principle of measurement is applicable also to the case where two transmitters and one receiver are employed. In actual equipment, the former is more adapted for practical use than the latter which requires some means to discriminate between the transmitters with respect to the received signal.

Figure 2:
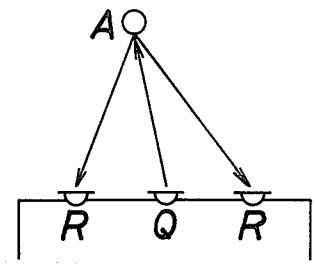
FIGS. 2 to 4 are respective detail views showing the position, transmission and reflected wave of an ultrasonic wave transmitter-receiver and of an ultrasonic wave receiver.
Figure 3:
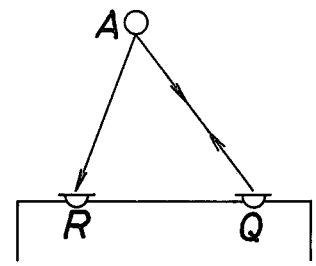

In the illustration of FIG. 2, the distance and direction to the object A are obtainable as intersecting points of two ellipses. If a transmitter and a receiver are combined to constitute a single unit, one receiver is rendered omissible as shown in FIG. 3, where the distance and direction to the object A can be obtained as an intersecting point of one circle and one ellipse.

Usually, however, the object A exists not as a point but as a combination of a continuous object such as wall and a bar-like object such as electric-light pole or man. Therefore, the plane formed by the locus of a signal reflected from the object A and caught by the receiver is not always coincident with the plane formed by the locus of a signal caught by the transmitter-receiver. The solution of either Equation (7) or (8) is obtained by mapping one plane on the other, and the value of the error is determined by the angle formed by these two planes. However, since the points where the object A pierces through the two planes are considered to be substantially equal to each other, the angle formed by the two planes is not so wide, and consequently the error comes to have a small value causing no trouble in practical use.

Figure 4:
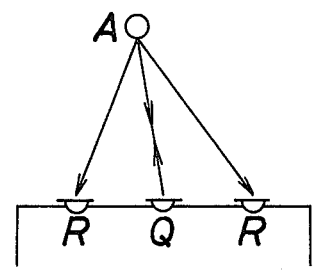
Figure 5:
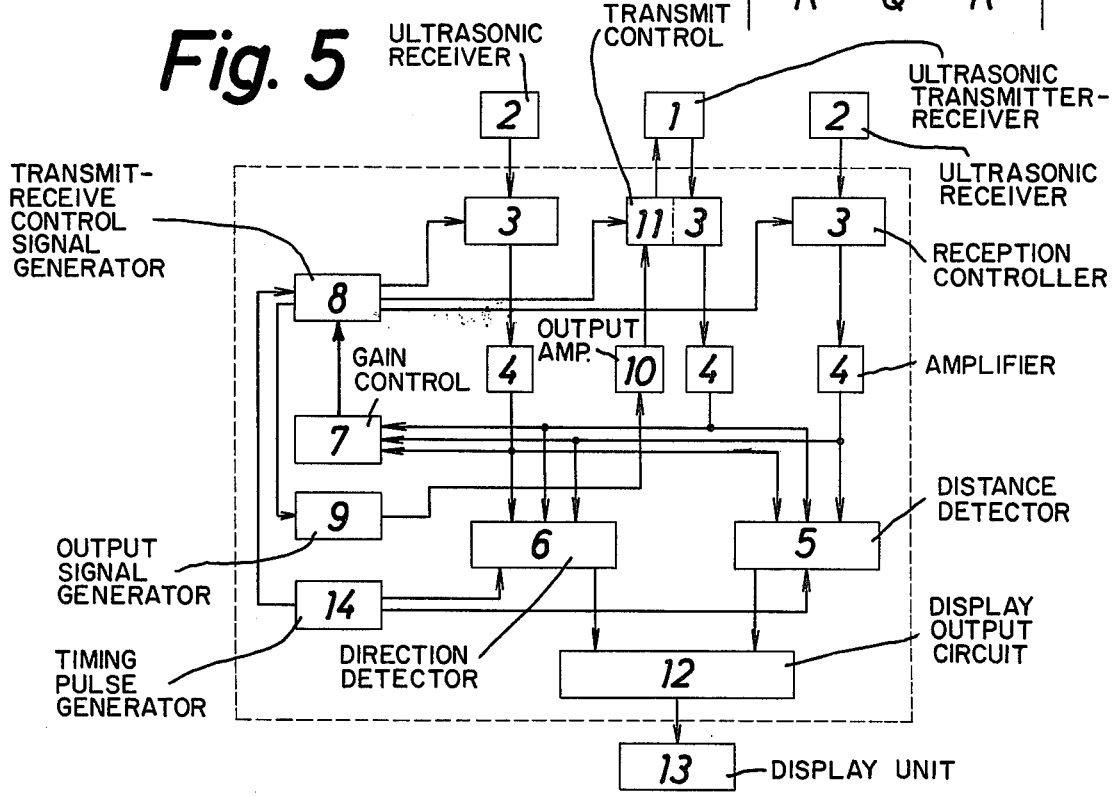
FIG. 5 is a block diagram of an example of a detecting apparatus.

In an extraordinary case where an object A is very low against the height of a vehicle or is inclined extremely to the ground with which the vehicle is in contact, there occurs an error between the minimum distance obtained from Equation (7) and the piercing points on the two planes, so that the minimum distance measured becomes greater than the true value. But such error is reducible by zero adjustment of an indicator or by predetermining the height of a reference line for measurement. With respect to the direction, it is desired that either side in the rear of a vehicle body is separable with the possible highest accuracy. In an attempt to achieve improvement in the reliability for a system, remarkable effect is attained by adding another receiver on the opposite side of a transmitter-receiver as plotted in FIG. 4, where it means increase of another piece of information to bring about an advantage in designing a processor as well.

Referring now to an exemplary embodiment shown in FIGS. 5 through 8, numeral 1 is an ultrasonic transmitter-receiver functioning as a sort of loudspeaker which converts electric signals of an ultrasonic frequency (20 to 100kHz) into air waves of compression and rarefaction and is switchable to a transmission mode or a reception mode through the application of piezoelectric effect. As its component part, an electro-strictive element or moving-coil type may be usable. In the embodiment of the present invention, however, a ceramic piezoelectric vibrator is employed in consideration of frequency, conversion efficiency, directivity, power capacity, mechanical strength, resistance against ambience and physical dimensions. A reference numeral 2 denotes a receiver functioning as a sort of microphone which converts ultrasonic waves propagating through the air into electric signals. The output of the receiver 2 is fed to a reception controller 3, whose output is fed to a distance detector 5, a direction detector 6 and a gain control circuit 7 through an amplifier 4 respectively. The output of the gain control circuit 7 is fed to a transmission-reception control signal generator 8, whose output is then fed to an output signal generator 9 and also to each reception controller 3. The output of the output generator 9 is fed through an output amplifier 10 to an ultrasonic transmission controller 11, whose output is fed to the ultrasonic transmitter-receiver 1.

In the meanwhile, the outputs of the direction detector 6 and the distance detector 5 are fed to a display output circuit 12, whose output serves to operate a display unit 13 which will be described afterward. A reference numeral 14 denotes a timing pulse generator, from which timing pulses are fed to the transmission-reception control signal circuit 8, direction detector 6 and distance detector 5 respectively.

Figure 6:
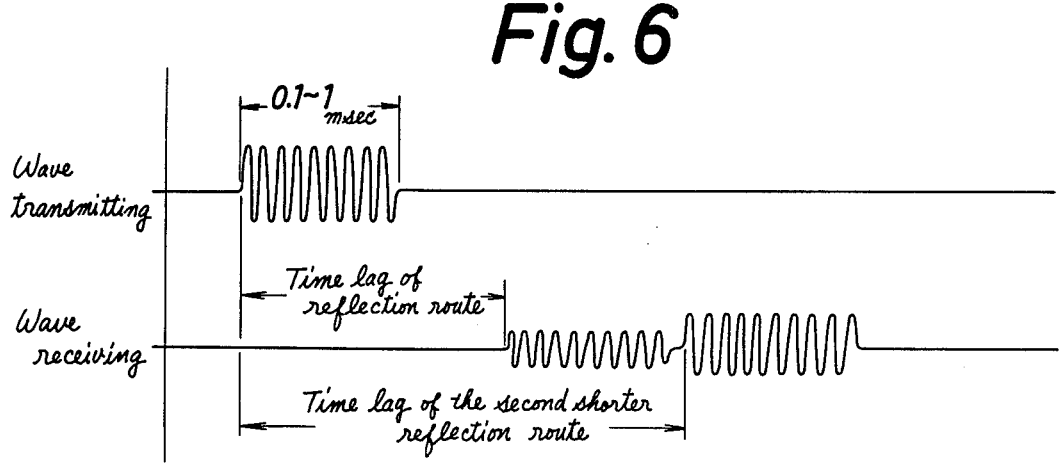
FIGS. 6 and 7 are a time chart of ultrasonic wave transmitting and receiving.
Figure 7:
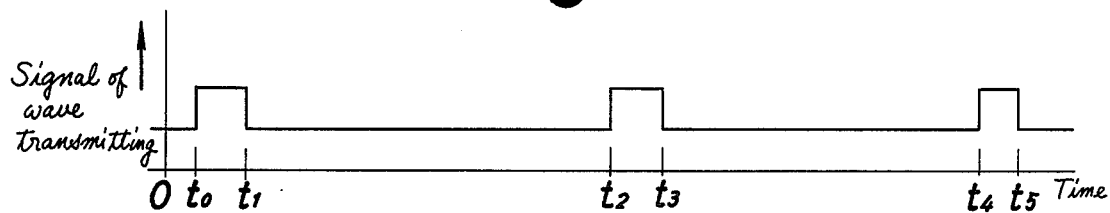

In this embodiment, ultrasonic-wave signals are transmitted for 0.1 to 1 millisecond from the transmitter-receiver, and the ultrasonic waves returned after reflection from an object (obstacle) are caught by the receiver and are caught by the receiver and are converted into electric signals. These signals arrive at the receiver sequentially in the manner that the one taking the shortest path from the transmitter via the object to the receiver is incident first. Depending on conditions, however, these signals vary as illustrated in FIG. 6. The signal transmitted and received is a kind of pulse similar to a burst or color sync signal used in color television. The received signal varies in accordance with reflection path, reflecting conditions (reflection angle, reflectivity, etc.), air temperature and humidity, wind velocity, location of reflex object and so forth. In this embodiment, the requirement is only the wave first reflected and returned after transmission, that is, the signal propagated through the shortest path of reflection. Therefore, any other waves posterior to the second and following waves are disregarded.

As for control of the ultrasonic signal to be transmitted, the pulse width or duration of the signal is limited in the following manner, and the measurable minimum distance is determined by the length of the signal duration. Since the receiving function is kept at a stop during transmission of the ultrasonic signal from the transmitter, the waves reflected and returned during that period are disregarded.

As well known, the sonic-wave propagation velocity at a temperature of 15° C is 340 meters per second. So, when the signal duration is 1 millisecond, the sonic wave propagates $340 \times 1/1000 = 0.34$ meters for 34 centimeters during that time. However, considering the fact that the wave is reflected and returned, in case the distance to an object is less than its half or 17 centimeters, the existence of this object is disregarded.

Consequently, if it is desired to further shorten the measurable minimum distance, the aim is achieved in principle by further narrowing the duration of a signal to be transmitted. Supposing now that the signal duration is reduced to 0.1 millisecond, the measurable minimum distance is shortened approximately to 1.7 centimeters. Practically, therefore, the duration in this case is to be set selectively to a proper value in a range from 0.1 to millisecond.

In the meanwhile, the duration itself is under restriction of the frequency of an ultrasonic signal to be transmitted. That is, if the ultrasonic frequency is 20KHz, only 2 cycles ($20 \times 10^3 \times 1/10^4 = 2$) of ultrasonic waves are transmitted during 0.1 millisecond. This brings about technical difficulties in signal processing, although it is of course possible to extend the lower limit of the duration as the ultrasonic frequency becomes higher.

As described above, there exists an interrelation among the ultrasonic frequency, signal duration and measurable minimum distance. Moreover, the selectable range of ultrasonic frequency is limited by entirely different conditions including directivity, linearity in propagation, stability, characteristics and availability of replacement element, and reflecting conditions.

Transmission and reception of ultrasonic signal are controlled in the following manner. The signal transmission is performed for a duration of 0.1 to 1 millisecond at a proper interval as mentioned already, and this interval is determined depending on a desired measurable maximum distance in detection of the existence of an obstacle. This will be explained with reference to the time chart of FIG. 7. After a time period $t_0 - t_1$ during which an ultrasonic signal is transmitted, the first signal transmission is kept at a stop during a time period $t_1 - t_2$ anterior to the next signal transmission. And simultaneously the signal reflected and returned is received also during the period $t_1 - t_2$, which is determined as follows.

The time T required from transmission of an ultrasonic signal to reception of the same signal through reflection is expressed as $T = 2 \times l/C$, in which $l$ is the distance from a transmitter-receiver to an obstacle, and C is sonic velocity. It is obvious from this equation that the distance $l$ to be measured and the reception time T are proportional to each other, and T corresponds to a period $t_0 - t_2$. In an exemplary case where the temperature is 15° C and the distance is 5 meters, $$T = 10/340 \approx 0.029 \text{ (seconds)}.$$

When the distance $l$ is 10 meters, T becomes 0.059 seconds. It is found from the above that the measurable maximum distance is determined by the time period $t_0 - t_2$.

Countermeasures are taken for elimination of ghost signal. The ultrasonic signal transmitted first during $t_0 - t_1$ is received during $t_1 - t_2$ by the receiver. The next signal transmitted during $t_2 - t_3$ is received during $t_3 - t_4$, but the signal transmitted previously during $t_0 - t_1$ is also received during $t_3 - t_4$ or even posterior to $t_5$ after propagation through a longer reflection path. Consequently, there may occur confusion that, in each of the reception periods ($t_1 - t_2$, $t_3 - t_4$ and so forth), such signal is processed as the reflected wave of the signal transmitted during the preceding transmission period. Such signal other than that being in a normal relation with respect to time, i.e., the signal received after propagation through a longer reflection path, take a longer time and its strength is attenuated in inverse proportion to the square of the distance. Therefore, the following countermeasures are effective to eliminate it.

(1) To extend the measurement repetition time to a range where no problem arises in practical use.
(2) To transmit signals of two or three ultrasonic frequencies alternately
(3) To find the ghost through pattern recognition processing of the received signal
(4) To eliminate the low-level signal by providing an automatic gain control circuit in the amplifier
(5) To eliminate the ghost by controlling the amplifier gain in relation to time Although Item (1) is considered to be the most inexpensive method, it is necessary to discuss the point concerning the number of times of measurements per second. Items (2) and (3) render the apparatus complicated and expensive, but there exists no question with respect to the number of times of measurements. For solution of this ghost signal problem, it is of course possible to take any one of the above five items individually or a combination of them.

Figure 8:
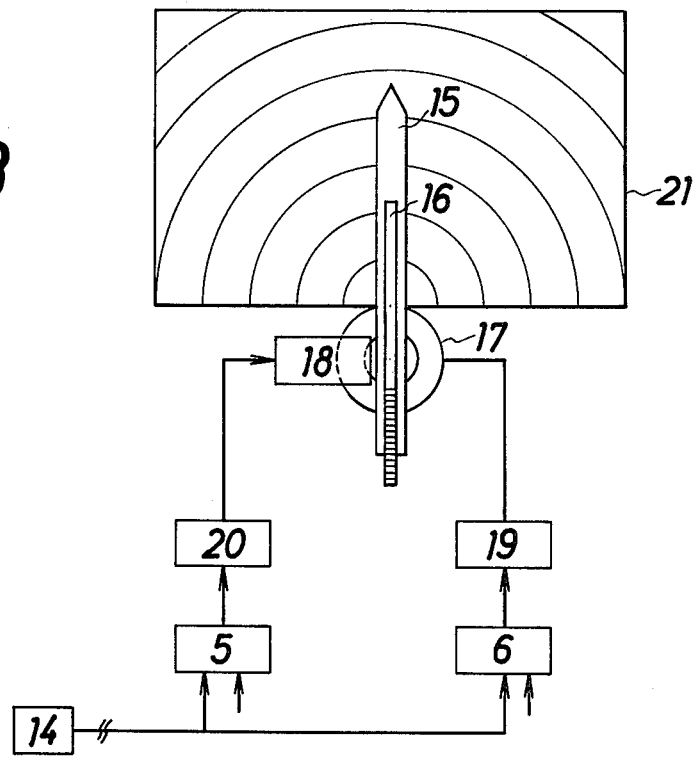
FIG. 8 is a view showing the structure of the display unit.

The display unit 13 serves to display the existence of an obstacle and its exact position for a driver. In FIG. 8, 15 is a direction pointer, on which a distance pointer 16 is freely movable. The direction pointer 15 is rotated by a first pulse motor 17, while the distance pointer 16 is rotated by a second pulse motor 18 disposed orthogonally with the first pulse motor 17. These two motors are driven by the outputs of drive circuits 19, 20 actuated by the outputs of the aforementioned distance detector 5 and direction detector 6 respectively. A reference numeral 21 denotes an indicator.

When installing the above-described apparatus in an automobile or the like, the transmitter-receiver 1 and the receivers 2, 2 are disposed in a row at the rear of the automobile (not shown), and the indicator 21 is provided at a place easily observable for the driver, while other parts are set at desired points in the automobile. For a power source, a battery (not shown) equipped in the automobile is utilized.

The apparatus operation is as follows. First, when a predetermined voltage is applied to the apparatus, clock pulses are generated from the timing signal generator 14 to drive synchronously the transmission-reception control signal generator 8, direction detector 6 and distance detector 5. The output of transmission-reception control signal generator 8 is amplified sufficiently by the output amplifier 10 and then is fed to the transmission controller 11, which controls the transmitter-receiver 1 in the manner that ultrasonic waves are transmitted only during a predetermined time and subsequently the transmitter-receiver 1 is switched to a reception mode.

The ultrasonic waves thus transmitted arrive at the receiver 2 again after reflection from the obstacle A, and out of the first reflected waves, the signal received by the transmitter-receiver 1 and the signal received by the receiver 2 are amplified by the amplifier 4. After demodulation, shaping and noise elimination, the amplified signals are fed to the direction detector 6, distance detector 5 and gain control circuit 7 to effect detection of the direction, detection of the distance, and conversion of the display signal. By discriminating that which of the left and right receivers 2, 2 has first received the reflected wave, it is found in this stage that on which side in the rear of the automobile body the obstacle A exists. For detection of the distance, the time difference between the signal arrival at the receivers 2, 2 and that at the transmitter-receiver 1 is obtained digitally by the use of clock pulses and then is processed through operational computation. And simultaneously the angle, which is formed by the straight line connecting the center of the automobile body with the obstacle A, is obtained to determine the direction and is processed through accurate operational computation on the basis of the aforementioned ellipse and circle equations or through simplified operational computation according to the conditions of time difference combination.

The output signals thus obtained from the direction detector 6 and the distance detector 5 are converted into analog or digital signals, which are then fed to the first and second pulse motors 17, 18 through the drive circuits 19, 20 so as to rotate the direction pointer 15 by an angle proportional to the value of the related signal and also to slide the distance pointer 16 by a length proportional to the value of the related signal, thereby indicating the position of the obstacle A in the mode of polar coordinates on the indicator 21.

In this way, the drive becomes capable of accurately perceiving the obstacle that exists behind the automobile 22, without performing any particular manipulation.

As the received signal is affected by external factors such as wind or noise, its waveform is distorted due to the higher harmonic components included therein. But a predetermined rectangular waveform is attainable through shaping by means of a known filter.

Figure 9:
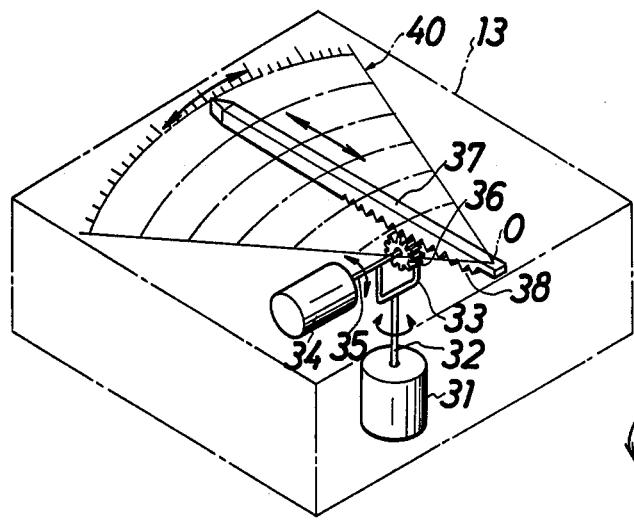
FIG. 9 is a perspective view of the structure in FIG. 8.

The more detailed structure of the display unit 13 will now be described in connection with FIG. 9.

Numeral 31 is the first pulse motor for indicating deflection angle to be actuated by the output of the drive circuit 19, and a rotation shaft 32 of the first pulse motor 31 stands perpendicularly. Further, a U-shape support 33 is linked with the perpendicular shaft 32. And another rotation shaft 35 connected to the support 33 is fixed with the second pulse motor 34 which is positioned with a right angle in relation with the first pulse motor 31. One end of the U-shape support 33 is fixed with a small gear 36.

A pointer 37 is provided with rack means 38 to be engaged with the small gear 36. Due to this structure the pointer 37 is reciprocated in a linear direction on the plane. The cardinal point of the pointer 37 is coincided with the polar point of an indicating panel 40.

The function of the foregoing structure will now be described. First, when the output of the direction detector 6 is put in the drive circuit 19, it is sufficiently amplified in the drive circuit 19, and then converted into a given pulse signals (corresponding to the quantity of input signals from the direction detector 6). Thus, the first pulse motor 21 is rotated with a given quantity. Since the pointer 37 engaged with the small gear 36 is rotated with a given angle, the direction (deflection angle) of the position of the object to be measured is indicated.

Just as mentioned previously, when the output of the distance detector 5 is fed to the second pulse motor 34 and it is rotated only with the quantity relative to the output, the pointer 37 having racks engaged with the gear 36 is actuated with a given quantity, and then the distance to the object is indicated.

At the place where the object to be measured is positioned, the direction (deflection angle) and distance (radius vector) to the object can be indicated on the indicating panel 40 like a polar coordinate, it is possible to see the measuring state accurately and instantly.

Figure 10:
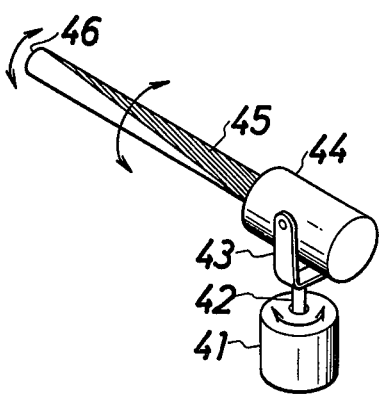
FIG. 10 is a perspective view of an example of the structure of the display unit.

Another example of the display unit 13 will now be described in connection with FIG. 10. Numeral 41 is the first pulse motor for indicating deflection motor as described previously. The end of a rotation shaft 42 is connected with a U-shape support 43 with which is fixed the second pulse motor 44. A rotation shaft of the second pulse motor 44 is of rod-shape, and the outer surface of the rotation shaft has a colored mark portion 45 which is formed in an oblique direction. A pointer 46 fixed with the end of the colored mark portion 45 is variable due to the rotation of the shaft 42.

Accordingly, when the output signal from the direction detector 6 is fed to the first pulse motor 41 by way of the drive circuit 19, the direction (deflection angle) of the second pulse motor 44 and of the pointer 46 is determined due to the axial rotation of the first pulse motor 41. Further, when the output signal from the distance detector 5 is fed to the second pulse motor 44, the pointer 46 is rotated axially in relation with the signal quantity, consequently a triangle-shape colored mark portion 45 being indicated on the panel 45. The distance from the pointer 46 to the cardinal point is thus indicated as a radius vector corresponding to the output from the distance detector 5.

Figure 11:
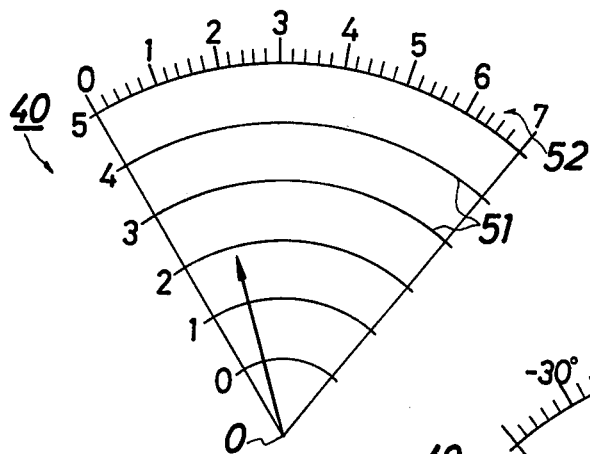
FIGS. 11 and 12 are plan views showing examples of an indicator of the display unit.
Figure 12:
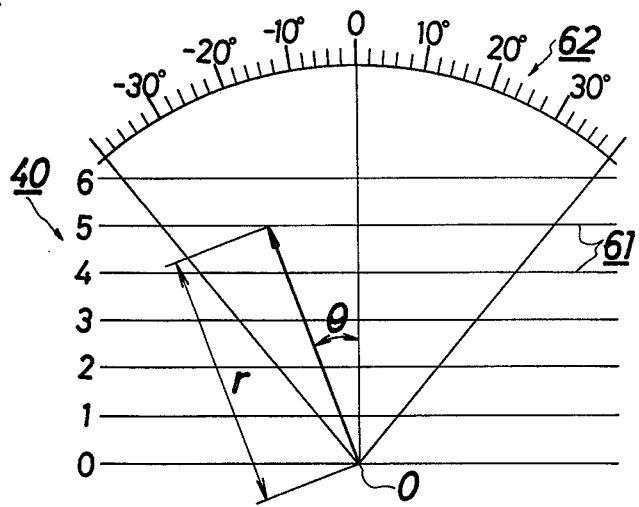

As shown in FIGS. 11 and 12, the indicating panel 40 is provided with a fan-shaped scale 51 having graduations of the distance and of the direction angle. Thus, the distance of and the direction of the pointer can be measured easily. Alternatively, the indicating panel 40 is provided with parallel graduations 61 in an x-axis direction from the polar point O so that the distance of and the direction of the pointer can be visible more easier. By plotting an arc-shape angle 62 with an equal graduation, a vector-like indication and an absolute value $| r.\sin \theta |$ of the distance from the cardinal point can be obtained very easily with no special operation.

Further, the input signal is desired for either analog signal or digital signal.

It is to be understood that the present invention is not limited to the above embodiment alone but may be modified variously within its technical scope.

According to the present invention, as mentioned hereinabove, ultrasonic waves are transmitted from a transmitter-receiver. And regarding the earliest-returned waves posterior to reflection at an obstacle, a point, where the circular locus of the first reflected wave received by the transmitter-receiver intersects the elliptical locus of the second reflected wave received by other receiver, is found to detect the position of the obstacle in the mode of polar coordinates, and this position is indicated on an indicator or, if necessary, the distance to the obstacle is rendered distinguishable by different audible sound levels, therey enabling the driver to perceive the exact direction and distance to the obstacle existing in a dead-angle range without any particular manipulation. Moreover, with elimination of mechanically moving parts, accurate detection of the obstacle position is achieved by a single measurement. Furthermore, the invention is applicable in a wide scope including not merely the automobile but also other powered vehicles and various machines used in the transport industry. And in addition to such a variety of outstanding features, there is another advantage that the apparatus can be manufactured at low cost.

What is claimed is:

1. An obstacle-detecting apparatus using ultrasonic waves comprising, in combination, an ultrasonic transmitter-receiver having a transmit and a receive mode; an ultrasonic receiver spaced a predetermined distance from the transmitter-receiver; control means operative for causing the transmitter-receiver to assume its transmit mode and transmit an ultrasonic wave into space for impingement upon and reflection back from an obstacle to be located and then to assume its receive mode so that both the transmitter-receiver and the receiver will receive an ultrasonic wave reflected from the obstacle; distance-determining means operative for determining the distance to the obstacle and generating a corresponding distance signal at least in dependence upon the travel distance of the wave transmitted by and then received by the transmitter-receiver; and direction-determining means operative for determining the direction in which the obstacle is located relative to the transmitter-receiver and generating a corresponding direction signal by determining a circular distance-locus whose radius is dependent upon at least the travel distance of the wave transmitted by and then received by the transmitter-receiver, by determining an elliptical distance-locus whose focalradii-sum is dependent upon at least the travel distance of the wave transmitted by and then received by the transmitter-receiver and the travel distance of the wave transmitted by the transmitter-receiver and received by the receiver, and by determining the intersection of these two loci.

2. The apparatus defined in claim 1; furthermore comprising analog polar-coordinate display means operative for displaying the direction and distance of the obstacle, the display means comprising a pointer; mounting means mounting the pointer for movement in a first direction for varying the direction indicated by the pointer and in a different second direction for varying the distance indicated by the pointer by varying the display length of the pointer measured in the direction of elongation of the pointer; first moving means connected to the direction-determining means for receipt of the direction signal and operative in dependence upon the latter for moving the pointer in said first direction; second moving means connected to the distance-determining means for receipt of the distance signal and operative in dependence upon the latter for moving the pointer in said second direction.

3. The apparatus defined in claim 2, said mounting means comprising means mounting the pointer for rotation about a rotation axis perpendicular to the pointer, rotation of the pointer about the axis constituting movement in said first direction, and means including a rack and pinion transmission driven by the second moving means mounting the pointer for shifting movement along the direction of elongation of the pointer.

4. The apparatus defined in claim 2, said mounting means comprising means mounting the pointer for rotation about a rotation axis perpendicular to the pointer, rotation of the pointer about this axis constituting movement in said first direction, and means coupled to said second moving means mounting the pointer for rotation about the longitudinal axis of the pointer, rotation of the pointer about its own longitudinal axis constituting movement in said second direction, the pointer having two visually distinguishable surface zones extending generally along the length of the pointer and defining between themselves a boundary line which likewise extends generally along the length of the pointer but oblique relative to the longitudinal axis of the pointer, whereby as the pointer is rotated about its longitudinal axis the length of the visible portion of one of said zones changes.

* * * * *